Aug. 19, 1969    F. PEDERSEN ET AL    3,461,824

INCINERATION METHOD

Filed April 8, 1968

INVENTORS
Fredrik Pedersen
Eilif Indbryn
By Watson, Cole, Grindle & Watson
ATTORNEYS

United States Patent Office 3,461,824
Patented Aug. 19, 1969

3,461,824
INCINERATION METHOD
Fredrik Pedersen, Even Lorengs vei 6, 7000 Trondheim, Norway, and Eilif Indbryn, Namsos, Norway; said Indbryn, assignor to said Pedersen
Continuation-in-part of application Ser. No. 675,716, Oct. 16, 1967, which is a continuation of Ser. No. 404,069, Oct. 15, 1964, now abandoned. This application Apr. 8, 1968, Ser. No. 727,123
Claims priority, application Norway, Oct. 16, 1963, 150,470; Mar. 5, 1964, 152,292
Int. Cl. F23g 5/00; F23b 1/38; F23l 7/00
U.S. Cl. 110—7
4 Claims

ABSTRACT OF THE DISCLOSURE

A method is disclosed for the combustion of refuse without pollution of the atmosphere. The cold refuse is placed in a grateless incinerator and then gradually heated without admitting air until the refuse is in a completely dry state and the self-ignition temperature of the refuse has been reached. A slight amount of air is then admitted to maintain combustion.

---

Figure 1:
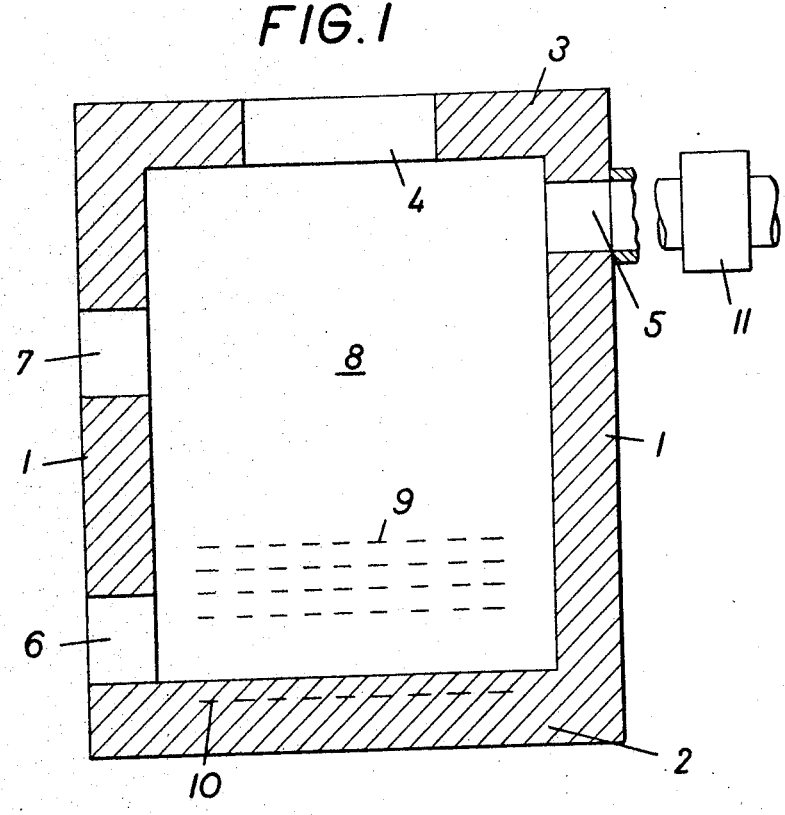

This is a continuation-in-part of our prior application Ser. No. 675,716, dated Oct. 16, 1967, which is a continuation of our prior application Ser. No. 404,069 dated Oct. 15, 1964, now abandoned.

The present invention relates to an incineration method, and the combustion and destruction of anatomical tissue, refuse and other waste materials from households, hospitals, factories or offices.

Conventional systems for combustion of refuse and other waste materials give rise to disadvantages, due to ashes, dust and production of gas and/or smoke, odor and transmission of infection. This is due to the fact that the combustion takes place when the material is, at least partly in a moist condition. The undesirable combustion products referred to, usually are discharged through a chimney to atmosphere. Efforts have been made to avoid the inconveniences inevitably pursuant to such escape into open air, but neither filters, smoke combustion or spraying with water has proved entirely satisfactory. Experience has shown that if the combustion is carried out at a high temperature and with the minimum admission of air, in a manner similar to that used in the operation of cremation incinerators, the amount of combustion products may be substantially reduced, but the inconveniences referred to are nevertheless not avoided in a fully satisfactory manner.

The object of the present invention is a method of operation of an incinerator for the purpose indicated, through which any contamination of the surrounding atmosphere is avoided and through which, in addition, a considerable economy in the costs of the combustion is achieved.

This and other objects are achieved by a method comprising the steps of feeding the materials into a grateless incinerator while this is in a cold condition, slowly and gradually heating the said materials without admitting any air until said materials are in a completely dry state, and until self-ignition temperature has been reached, thereupon allowing a slight admission of air, the air admission being sufficient to maintain combustion but still at such low value that material is not carried off from inside the incinerator, and subsequently adjusting the admission of air when the combustion is half-complete in order to maintain the temperature in the furnace space at a desired level, such as at about 800° C.

This method of operation is particularly adapted in plants operated with indirect heating (e.g., electric heating) of the incinerator space. During the drying stage the materials are thoroughly heated and dried until self-ignition takes place whereby a rapid and complete combustion with a minimum amount of ash and slag is obtained.

The slight admission of air once the self-ignition has taken place is preferably effected automatically, the amount of such admission being such that any substantial carrying off of particles is avoided.

Preferably, the gas, vapour, and dust formed combustion products are extracted by a suction pump into a closed space in which they are subjected to a spray of atomized water and thence, possibly through a filter, led off to the drain. In the spray zone, there will be a condensation of gas and vapour, accompanied with an intimate admixture and dilution of the products with water so that they may be harmlessly led off through an ordinary drain. By introducing a filter, such substances can be withheld which would not otherwise, for any reason, be condensed and led into the drain, such as certain chemicals or solid constituents.

The accompanying drawings diagrammatically illustrate an incinerator and a plant incorporating such incinerator for operation according to the invention.

Figure 2:
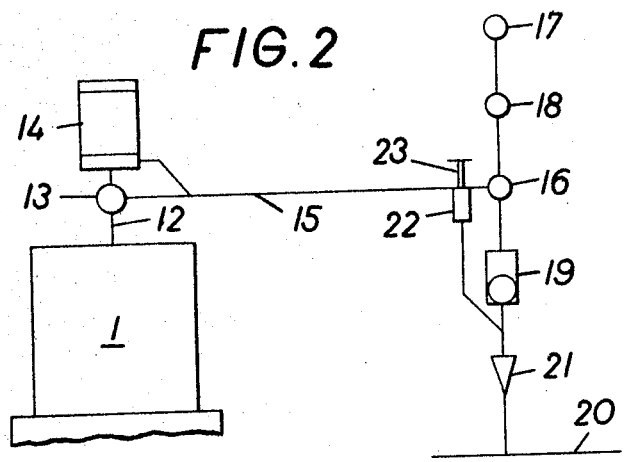

In the drawings, FIG. 1 is a diagrammatical sectional view of an incinerator for operation in accordance with the invention, and FIG. 2 discloses diagrammatically a plant including an incinerator for operation in accordance with the invention.

The incinerator shown in FIG. 1, comprises side walls 1, bottom wall 2 and top wall 3, made of materials adapted to stand temperatures above about 1350° C. In the top wall 3, there is provided an opening 4, for the charging of the materials to be burned, and provided with a lockable closure of any convenient construction which, for the sake of clarity is not shown. In the back wall 1 of the incinerator, there is provided an exhaust opening 5 communicating with a chimney or with a further part of the plant, to be described with reference to FIG. 2. In the front wall 1, there is provided an opening 6 at or near the bottom wall 2, and an opening 7 at a level higher than that of the opening 6. The two openings 6 and 7 serve to admit air to the incinerator space 8, the opening 7 being, possibly, communicating with a supply of cooling agent, for cooling down the incinerator space after completed combustion. The lower opening also serves the removal of slag. All supply oxygen or liquid or gaseous fuels is, if required, to be automatic over separate supply lines.

In the side walls 1 and possibly also in the bottom wall 2, there is incorporated heat sources 9 and 10 respectively, for the heating of incinerator content. The sources preferably are electrical, either ordinary resistance coils or high frequency heating devices.

The material to be burned is charged into the incinerator through the opening 4, while both the goods and the incinerator are in cold condition. Upon closing of the opening 4 and of openings 6 and 7, the heating means 9 and 10 are switched on, for the purpose of drying the goods to a completely dry state, without admitting any air. When self-ignition conditions are reached, a limited admission of air is allowed, preferably by means of devices which automatically operate in dependency of temperature and/or time, and self-ignition takes place, the temperature rising to about 1000° C. or preferably about 800° C. The air admission is maintained at such a low value that no material is carried off from inside the incinerator. The air admitted also serves to adjust the temperature in the incinerator space to a suitable value such is about 800° C. Due to there being no air admission during the heating period, no noticable discharge of air takes place prior to the ignition of the incinerator contents. Vapour discharge will of course depend on the original humidity of the material, but still the discharge rate will be insubstantial. Thus substantially no smoke, ash, dust, odor or bacillae will enter the chimney through the opening 5. When the incinerator contents has arrived at the completely dry state, the combustion of the same will not produce any appreciable smoke or odor, and no bacillae could survive at the high temperatures developed during the combustion of such completely dry materials.

As indicated in the drawing, the incinerator is not provided with any grate, so that the material to be burned rests directly on the top surface of the bottom wall 2. Consequently, no sump is formed underneath the goods, in which the temperature might be lower than in the zone of actual combustion and in which unburnt or noncombustible materials might accumulate and form the base of non-desirable bacillae cultures.

In cases of particularly difficult combustion, a spray of oxygen or fuel may be admitted through separate supply lines (not shown) when the self-ignition has actually taken place.

The closure of the opening 4 may be arranged so as to prevent opening while the incinerator is hot. For the same purpose, the heating devices 9, 10 may be provided with switching elements preventing heating while any of the openings 4, 6 and 7 is open.

As indicated in FIG. 1, the incinerator may be equipped with a subsequent combustion chamber or bacteria killer 11 provides with electrical means for the combustion of any gaseous substance discharge through the opening 5 during the drying period. Such chamber is of particular interest when the incinerator is installed in hospitals, laboratories and similar institutes.

Preferably the incinerator shown in FIG. 1 is included in a plant as shown in FIG. 2, in which the drying and combustion incinerator is marked 1. The incinerator is equipped with an outlet 12, corresponding to the opening 5 of FIG. 1, through which gaseous, vapourous or dust formed products from the incinerator are fed through a three-way valve 13 either to a heat exchanger 14, of a construction similar to a smoke tube boiler, or through a duct 15 to a cold water atomizer 16.

Since the heat exchanger 14 communicates with the duct 15, the products alternatively may be fed through the heat exchanger 14 or directly to the atomizer 16. This facility has the advantage that during the drying period of the incinerator operation, when the temperature of the product is so low that no benefit may be obtained through the heat exchanger, the heat exchanger can be by-passed.

The cold water atomizer 16 is supplied with cold water from the main supply 17, through an automatic valve 18. In the atomizer, the products from the incinerator are sprayed with atomized water so that an intimate mixture of water and the combustion products, or their condensates, is obtained. A suction pump 19 in the outlet from the atomizer maintains a constant suction through the atomizer 16, the duct 15, to the incinerator proper, so that the combustion may be effected at an extremely low total consumption of air, in the order of 50 cubic ft. per cubic ft. of materials to be burnt. From the delivery side of the pump 19, the mixture produced in the atomizer 16 is led to a drain 20, if necessary through a filter 21 for retaining any solid material and/or particular chemicals which should be prevented from entering the public drain. A safety valve 22 is provided in the duct 15 and is connected to the drain 20 through a by-pass pipe leading directly to the filter 21 and thus avoiding the atomizer 16 and the pump 19. The safety valve 22 is so arranged that any high pressure products, for instance derived from a possible explosive combustion, will be passed directly to the said by-pass pipe and thence to the drain 20. The plant may also be equipped with an adjustable airing valve 23 for suction of air to adjust the pressure in the plant, in particular during the drying period, so that the pump 19 may be a constant effect pump.

We claim:
1. A method for the combustion and destruction of anatomical tissue, refuse and other waste materials without the pollution of the atmosphere, comprising the steps of feeding the said materials into a grate-less incinerator in cold condition, slowly and gradually heating the said materials without admitting any air until said materials are in a completely dry state and until self-ignition temperature has been reached, thereupon allowing a slight admission of air sufficient to maintain combustion but still at such low value that material is not carried off from inside the incinerator, and subsequently adjusting the admission of air when the combustion is half-complete in order to maintain the temperature in the furnace space at about 800° C.

2. A method as claimed in claim 1, futher comprising admission of oxygen after self-ignition has occurred.

3. A method as claimed in claim 1, further comprising introduction of fuel after self-ignition has occurred.

4. A method as claimed in claim 1, wherein the gaseous combustion products are conveyed to a closed chamber and subjected to a rain of vapourised water prior to being discharged.

References Cited
UNITED STATES PATENTS

| | | | |
|---|---|---|---|
| 2,845,882 | 8/1958 | Bratton | 110—8 |
| 2,869,487 | 1/1959 | Sherman | 110—8 |
| 2,895,433 | 7/1959 | Michaelis | 110—8 |
| 3,215,100 | 11/1965 | Fabry | 110—8 |

JAMES W. WESTHAVER, Primary Examiner

U.S. Cl. X.R.
110—18